United States Patent [19]

Kashimura et al.

[11] Patent Number: 5,103,298
[45] Date of Patent: Apr. 7, 1992

[54] ERROR CORRECTION METHOD AND CIRCUIT FOR NONLINEAR QUANTIZATION CIRCUIT

[75] Inventors: Naoki Kashimura, Tokyo; Jun Hattori; Eiji Nakamura, both of Kawasaki, Japan

[73] Assignee: Ikegami Tsushinki Co., Ltd., Tokyo, Japan

[21] Appl. No.: 579,603

[22] Filed: Sep. 7, 1990

[30] Foreign Application Priority Data

Sep. 19, 1989 [JP] Japan .................. 1-240533

[51] Int. Cl.$^5$ .................. H04N 9/69; H04N 5/702
[52] U.S. Cl. .................. 358/32; 358/164
[58] Field of Search .................. 358/32, 164, 37

[56] References Cited

U.S. PATENT DOCUMENTS

| | | | |
|---|---|---|---|
| 4,396,938 | 8/1983 | Dischert | 358/32 |
| 4,686,562 | 8/1987 | Yamanaka | 358/32 |
| 4,805,013 | 2/1989 | Dei et al. | 358/164 |
| 5,012,163 | 4/1991 | Alcorn et al. | 358/32 |

FOREIGN PATENT DOCUMENTS 62-60392  9/1985  Japan .

Primary Examiner—Howard W. Britton
Assistant Examiner—Wendy R. Greening
Attorney, Agent, or Firm—Spencer & Frank

[57] ABSTRACT

An error correction method and circuit for a nonlinear quantization circuit comparing a test signal which is produced from an error correction table by applying an analog reference signal into a nonlinear circuit with reference data that is defined as an output of the error correction table when the nonlinear circuit has no error, and updating the error correction table by the test signal and the reference data when they disagree. The output of the nonlinear circuit is corrected by using the error correction table. The technique is particularly suitable for nonlinear conversion performed by a gamma correction circuit of a color television camera.

13 Claims, 8 Drawing Sheets

```
        ADC
DRS   INPUT              ┌─ 6
 0 ──── 0      │    0    │
               │         │
               │    ┊    │
               │         │
 1 ──── 16     │    16   │
               │         │
 2 ──── 23     │    23   │
               │         │
 3 ──── 28     │    28   │
               │         │
 4 ──── 32     │    32   │
               │         │
 5 ──── 36     │    36   │
               │         │
               │    ┊    │
               │         │
254 ── 254     │   254   │
255 ── 255     │   255   │
        ERROR CORRECTION TABLE
              ( INITIAL )
```

FIG.4A

| DRS | ADC OUTPUT | 6 |
|---|---|---|
| 0 → 0 | 0 | |
| 1 → 13 | 16 | |
| 2 → 19 | 23 | |
| 3 → 24 | 28 | |
| 4 → 27 | 32 | |
| 5 → 31 | 36 | |
| ... | ... | |
| 254 → 254 | 254 | |
| 255 → 255 | 255 | |

ERROR CORRECTION TABLE
(UPDATED)

FIG. 4B

```
         ADC
  DRS  OUTPUT         ╱6
   0 ──→ 0    |   0   |
                 ┊
   1 ──→ 15   |  16   |

2 ──→ 18   |  23   |

3 ──→ 23   |  28   |
   4 ──→ 26   |  32   |

5 ──→ 30   |  36   |
                 ┊

┊
 254 ──→ 254  |  254  |
 255 ──→ 255  |  255  |
```

ERROR CORRECTION TABLE
( FURTHER UPDATED )

FIG.4C

ERROR CORRECTION METHOD AND CIRCUIT FOR NONLINEAR QUANTIZATION CIRCUIT

BACKGROUND OF THE INVENTION

1. Field of the Invention

The present invention relates to an error correction method and circuit for nonlinear quantization circuit, and in particular, to the method and circuit that can automatically correct characteristic dispersion of a nonlinear circuit of the nonlinear quantization circuit or deviation from a predetermined nonlinear curve of the nonlinear circuit, which results from deterioration of the nonlinear circuit with age, or from the influence of environmental temperature.

2. Description of the Prior Art

Nonlinear quantization, for example of a video signal, is performed by analog-to-digital conversion of the video signal after it undergoes nonlinear conversion by a nonlinear circuit having a nonlinear characteristic curve as shown in FIG. 1. This enables the quantization circuit to improve the resolution for signals smaller than the middle amplitude of the video signal. The nonlinear curve in FIG. 1 is expressed by the following equation.

$$y = x^n (n < 1.0)$$

One example of the nonlinear conversion circuits is a gamma correction circuit used in a color television camera. The gamma correction circuit nonlinearly converts the video signal by using the nonlinear characteristics of semiconductor devices such as transistors and diodes. Therefore, the conversion characteristics of the gamma correction circuit tend to produce errors resulting from the deterioration with age and the influence of environmental temperature. Since the error occurs independently in each nonlinear circuit of the RGB channels, it causes color tone changes of an image. Therefore, each nonlinear circuit of the RGB channels must be strictly adjusted to have an identical curve.

Thus, the conventional nonlinear quantization circuit requires an analog nonlinear circuit of high stability and tedious adjustment.

SUMMARY OF THE INVENTION

It is therefore an object of the invention to provide an error correction method and circuit for a nonlinear quantization circuit that makes possible a stable nonlinear quantization independently of the dispersion of the nonlinear circuit characteristics resulting from the deterioration with age and the influence of environmental temperature.

Another object of the present invention is to provide an error correction method and circuit for a nonlinear quantization circuit that obviates tedious adjustment.

A further object of the present invention is to provide an error correction method and circuit for a nonlinear quantization circuit that can accomplish a nonlinear quantization according to a desired nonlinear characteristic curve.

In a first aspect of the present invention, there is provided an error correction circuit for nonlinear quantization circuit comprising:

a nonlinear circuit for performing a nonlinear conversion to an analog input signal;

means for generating a digital reference signal changing in a predetermined form;

a digital-to-analog converter for converting the digital reference signal to an analog reference signal;

means for feeding either the analog reference signal or the analog input signal to the nonlinear circuit;

an analog-to-digital converter for converting an analog signal produced from the nonlinear circuit into a digital signal;

an error correction table for converting the digital signal produced from the analog-to-digital converter so as to produce a corrected digital signal;

first memory means for storing a test signal which is produced from the error correction table when the analog reference signal is applied to the nonlinear circuit;

second memory means for prestoring reference data corresponding to the test signal when the nonlinear circuit has no error; and means for comparing the test signal and the reference data, and for updating the error correction table by the test signal and the reference data when the test signal and the reference data disagree;

wherein the output of the A/D converter undergoes the error correction by the error correction table and is produced as an output signal when the analog input signal is supplied to the nonlinear circuit.

In a second aspect of the present invention, there is provided an error correction circuit for nonlinear quantization circuit comprising:

gamma correction circuits for performing gamma correction to color video input signals;

means for generating a digital reference signal changing in a predetermined form;

a digital-to-analog converter for converting the digital reference signal to an analog reference signal;

means for feeding either the analog reference signal or the analog input signal to the gamma circuits;

analog-to-digital converters for independently converting the color video signals produced from the gamma circuits into digital signals;

error correction tables for independently correcting the digital signals produced from the analog-to-digital converters so as to produce corrected digital signals;

first memory means for storing test signals which are produced from the error correction tables when the analog reference signal is applied to the gamma circuits;

second memory means for prestoring reference data corresponding to the test signals when the gamma circuits have no error; and means for comparing the test signals and the reference data, and for updating the error correction tables by the test signals and the reference data when the test signals and the reference data disagree;

wherein the outputs of the A/D converters undergo the error correction by the error correction tables and are produced as color video output signals when the color video input signals are supplied to the gamma circuits.

In a third aspect of the present invention, there is provided an error correction method for nonlinear quantization circuit having a nonlinear circuit for performing nonlinear conversion to an analog input signal, and an error correction table for correcting the output of the nonlinear circuit, the error correction method comprising the steps of:

generating a digital reference signal changing in accordance with a predetermined form;

converting the digital reference signal into an analog reference signal;

feeding the analog reference signal to the nonlinear circuit;

converting an analog signal produced from the nonlinear circuit into a digital signal;

storing a test signal which is produced from the error correction table when the digital signal is applied to the error correction table;

storing the reference data corresponding to a waveform of the test signal obtained when the nonlinear circuit has no error;

comparing the test signal and the reference data, and updating the error correction table by using the test signal and the reference data when the test signal and the reference data disagree; and supplying the analog input signal to the nonlinear circuit, applying an output signal of the nonlinear circuit to the error correction table, and outputting an output of the error correction table as a corrected output signal.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 4A, 4B and 4C are schematic diagrams showing the arrangement of the error correction table, FIG. 4A showing the initialized state, and FIGS. 4B and 4C showing the updated state;

DETAILED DESCRIPTION OF PREFERRED EMBODIMENTS

The invention will now be described with reference to the accompanying drawings.

FIRST EMBODIMENT

Figure 1:
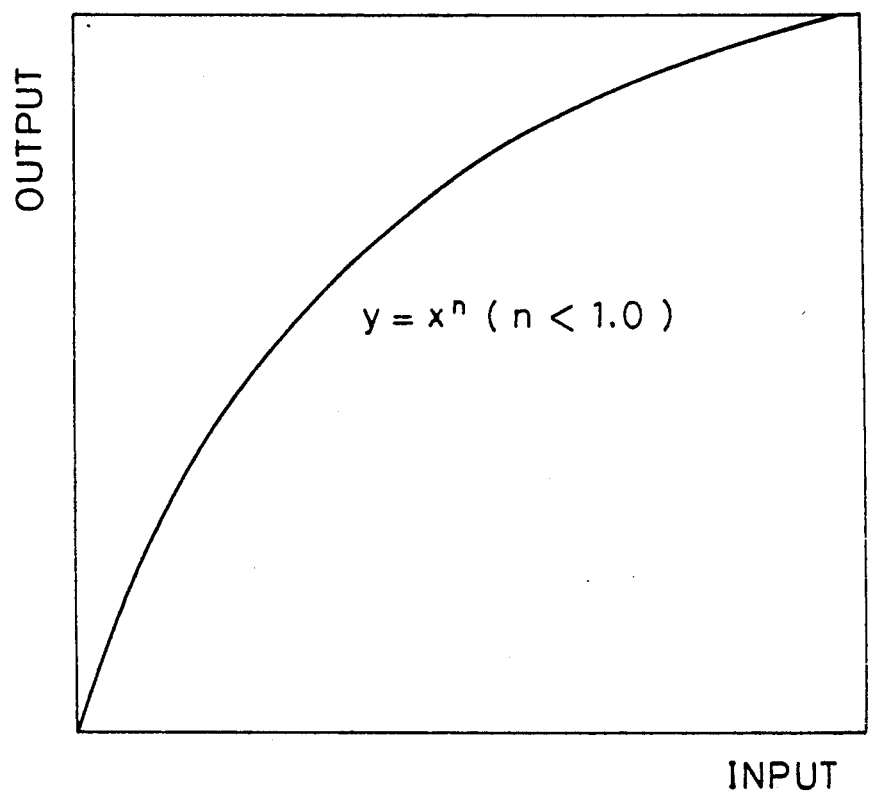
FIG. 1 is a graph illustrating an example of a nonlinear curve.
Figure 2:
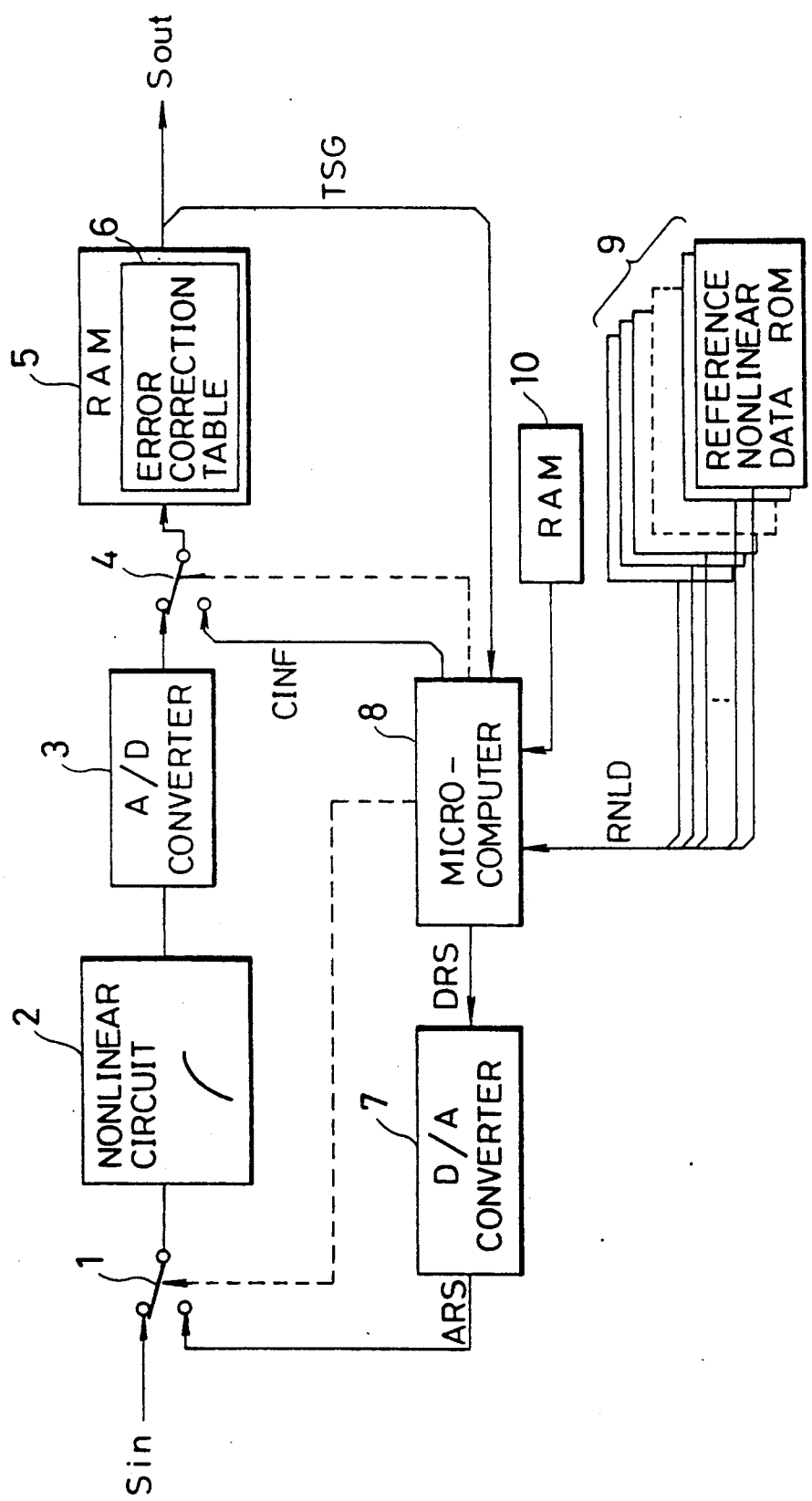
FIG. 2 is a block diagram showing an arrangement of a nonlinear quantization circuit according to a first embodiment of the present invention.

FIG. 2 is a block diagram showing a first embodiment of a quantization circuit of the present invention. In this figure, input signal Sin is fed to a nonlinear circuit 2 through a transfer switch 1. The nonlinear circuit 2 exhibits such characteristics as illustrated in FIG. 1. An analog nonlinear signal produced from the nonlinear circuit 2 is converted into a digital signal by an A/D converters 3, thus being quantized. The digital signal is fed to a RAM 5 through a transfer switch 4.

The RAM 5 includes a error correction table 6 for recording error correction information for correcting errors of the nonlinear circuit 2. The error correction information will be described later. The output of the error correction table 6 is supplied to the outside as an output signal Sout, or is fed to a microcomputer 8 as a test signal TSG.

The microcomputer 8 supplies a D/A converter 7 with a digital reference signal DRS. In addition, the microcomputer 8 writes the test signal TSG into a RAM 10, and compares it with the reference nonlinear data RNLD read out of a ROM 9, thus producing the error correction information CINF. The error correction information CINF is written to the error correction table 6 through the switch 4.

Here, the digital reference signal DRS, the test signal TSG, the reference nonlinear data RNLD, and the error correction information CINF will be described.

Figure 3:
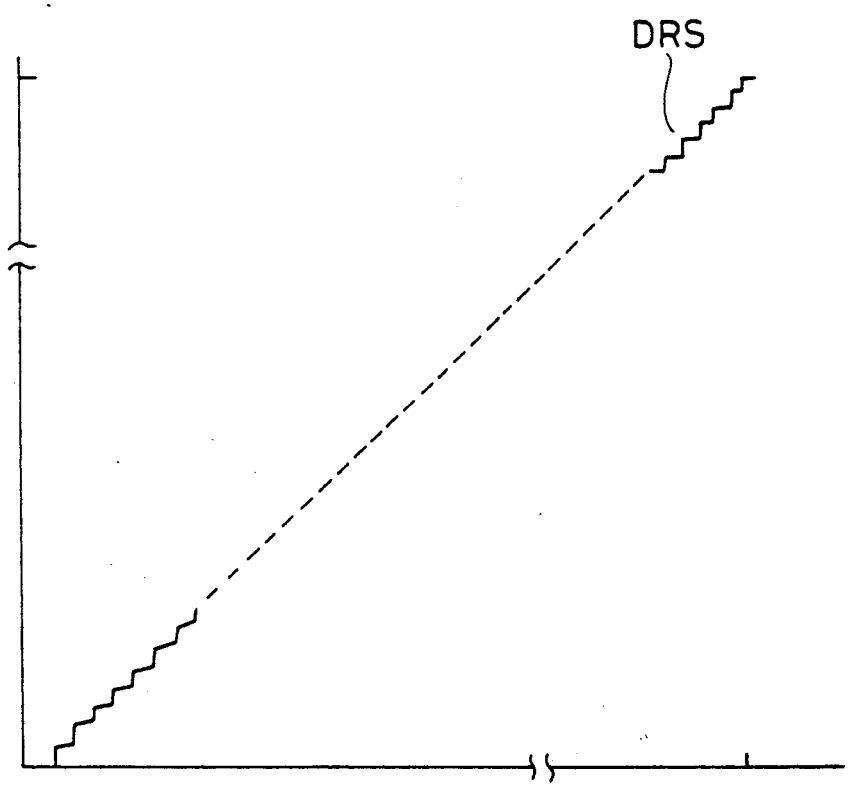
FIG. 3 is a graph illustrating an example of a digital reference signal DRS applied to a D/A converter.

(1) DIGITAL REFERENCE SIGNAL DRS (see FIG. 3)

The microcomputer 8 generates a digital reference signal of a staircase waveform increasing linearly as shown in FIG. 3, and supplies it to the D/A converter 7. The digital reference signal DRS is formed by single pulses which increase by a fixed step, thus increasing linearly with regard to time. The digital reference signal DRS is converted into an analog reference signal ARS by the D/A converter 7, and is applied to the nonlinear circuit 2 to test its nonlinearity. Incidentally, a staircase waveform decreasing linearly with regard to time can also be used as a digital reference signal.

(2) TEST SIGNAL TSG

The digital reference signal DRS is D/A converted to the analog reference signal ARS, and the signal ARS undergoes the nonlinear conversion of the nonlinear circuits 2. Then, the outputs of the nonlinear circuits 2 are supplied to the error correction table 6 in the RAM 5. The output of the error correction table 6 in this case is called a test signal TSG, which reflects the nonlinearity of the nonlinear circuit 2.

(3) REFERENCE NONLINEAR DATA RNLD

When the nonlinearity of the nonlinear circuit 2 is ideal and includes no error, the test signal TSG produced from the error correction table 6 corresponds to a perfectly correct waveform. The digital data corresponding to this test signal is stored in the ROM 9 as the reference nonlinear data RNLD.

(4) ERROR CORRECTION INFORMATION CINF

The error correction information CINF is obtained by comparing the test signal TSG and the reference nonlinear data RNLD, and indicates the error of the nonlinear circuit 2.

Generally, the test signal TSG takes discrete values. This is because the nonlinear circuit 2 has the nonlinearity given by the following equation.

$$y = x^n \; (n < 1.0)$$

Thus, the output of the A/D converter 3 assumes distinctly separated discrete values when the analog reference signal ARS is at a low level.

For example, let us suppose that the values 0–255 be nonlinearly converted according to the curve $y = x^{0.5}$, and then quantized into 8-bit notation. In this case, the maximum value of the input signal x corresponds to 255 and the minimum value thereof corresponds to 0. When x varies from 0 to 255, the output signal y is expressed by the following equation.

$$y = (x/255)^{0.5} \times 255$$

According to the equation, Table 1 is obtained.

TABLE 1

| x | y |
|---|---|
| 0 | 0 |
| 1 | 16 |
| 2 | 23 |
| 3 | 28 |
| 4 | 32 |
| 5 | 36 |
| . | . |
| . | . |
| . | . |
| 254 | 254 |
| 255 | 255 |

As seen from Table 1, the smaller the values x are, the greater the separation of the values y: for example, the values y between 0–16, i.e., 2, 3, 4, ... 15, do not appear in the test signal TSG.

FIGS. 4A and 4B show arrangements of the error correction table 6 in such a case. When the nonlinear circuit 2 has no error, the output of the A/D converter 3 alters its value as 0, 16, 23, 28, 32, 36, ... as the digital reference signal DRS changes its value as 0, 1, 2, 3, 4, 5, ..., respectively. The discrete values produced from the A/D converter 3 are supplied to the address terminal of the error correction table 6. Each address of the error correction table 6 includes error correction information, which can be read out as the output data by designating the address. For example, in FIG. 4A, each address of the error correction table 6 includes the same value as that of the address, which is set at the initial setting.

On the other hand, FIG. 4B is an example of the error correction table 6 when the nonlinear circuit 2 has errors. In this case, the output of the A/D converter 3 alters its values as 0, 13, 19, 24, 27, 31, ... as the digital reference signal changes its values as 0, 1, 2, 3, 4, 5, ... In other words, the errors of the nonlinear circuit 2 result in smaller values than the normal values shown in FIG. 4A. As a results, the error correction table 6 having the same content as that of FIG. 4A will produce the test signal TSG the values of which varies as 0, 13, 19, 24, 27, 31, ... The content of the error correction table 6 is called the error correction information.

Next, the operation of the embodiment will be described.

The operation of the embodiment can be classified into two large groups: the error correction mode and the common mode. These will be described below.

1. ERROR CORRECTION MODE

In the error correction mode, nonlinearity of the nonlinear circuit 2 is detected, and the error correction information of the error correction table 6 in the RAM 5 is updated according to the test signal TSG. Before entering the error correction mode, the microcomputer 8 changes the switch 1 to the opposite position to that of FIG. 2 (i.e., the switch 1 is connected to the D/A converter 7) with maintaining the position of the switch 4 at the position shown in FIG. 2 (i.e., the switch 4 is connected to the A/D converter 3). Further, the microcomputer 8 initializes the error correction table 6 as shown in FIG. 4A.

The operation of the error correction made will now be described with reference to a flowchart in FIG. 5.

First, at step S1, the microcomputer 8 generates a pulse that increases by a fixed step at a fixed interval. It is a digital reference signal DRS of a staircase waveform shown in FIG. 3. The digital reference signal DRS is converted into a linear analog reference signal ARS by the D/A converter 7 (step S2), which applies the signal ARS to the nonlinear circuit 2 via the switch 1. The nonlinear circuit 2 nonlinearly converts the analog reference signal ARS (step S3), and supplies the output thereof to the A/D converter 3.

The output of the A/D converter 3 is supplied to the error correction table 6 in the RAM 5 through switch 4 so as to undergo the correction of the error correction table 6 (step S5). In this case, however, the input to and the output from the error correction table 6 are the same because the error correction table 6 is initialized in advance as shown in FIG. 4A. The output of the error correction table 6 is fed back to the microcomputer 8 as the test signal TSG. The test signal TSG is a signal that reflects the preciseness of the nonlinearity of the nonlinear circuit 2.

The microcomputer 8 compares the test signal TSG with the reference nonlinear data RNLD read out from the ROM 9 (step S6). When the microcomputer 8 finds an error (i.e., difference between the two), it proceeds from step S7 to step S8, and sets an error flag to "1". When setting of the error flag is completed or the error is not found at step 7, the microcomputer 8 proceeds to step 9, and writes the test signal TSG into RAM 10.

The above steps S1–S9 are continued until the reference digital signal DRS shown in FIG. 3 reaches the uppermost step and so the pulse thereof is no longer generated. Next, when the error flag is "1", that is, when at least one error is found in the loop of steps S1–S10, the microcomputer proceeds from step S11 to S12, and updates the error correction table 6 as follows.

The microcomputer 8 first changes the switch 4 to the opposite position to that shown in FIG. 2 (i.e., the switch 4 is connected to the microcomputer 8). Namely, both the switches 1 and 4 are transferred to the opposite positions to those shown in FIG. 2. Thus, the microcomputer 8 enters into the error correction information updating mode, and updates the error correction information CINF of the error correction table 6.

The update is performed as shown in FIG. 4B. For example, let us assume that the test signal TSG alters its values as 0, 13, 19, 24, 27, 31, ..., as the digital reference signal DRS changes its values as 0, 1, 2, 3, 4, 5, .... The reference nonlinear data corresponding to these values of the test signal TSG are 0, 16, 23, 28, 32, 36, ... respectively, as shown in Table 1. Therefore, in the address designated by each value of the test signal TSG, the corresponding value of the reference nonlinear data is stored as shown in FIG. 4B. Thus, the error correction table 6 is updated by using the test data TSG and the reference nonlinear data that indicates the correct values of the test signal TSG.

In the process of updating, the following techniques are taken to improve the precision of the error correction table 6.

(1) The acquistion of the test signals TSG is repeated several times by generating the digital reference signal DRS several times. The error correction information is made by averaging several test signals thus obtained.

(2) The data in the error correction table 6 takes such discrete values as 0, 16, 23, 28, 32, ... as shown in FIG. 4A. Therefore, it is necessary to interpolate these discrete values when the error correction table 6 is corrected as shown in FIG. 4B. The simplest interpolation is a linear interpolation. Another interpolation commonly used is a least squares method, which gives a smooth second order interpolation curve.

(3) The bit number of data of the error correction table 6 is set greater than that of the address by m bits, thus improving the arithmetic accuracy of the error correction by a factor of $2^m$. For example, the bit number of the data is set at 12 bits, whereas that of the address is set at 10 bits. This makes it possible to improve the accuracy of the error correction information obtained by the interpolation.

Figure 5:
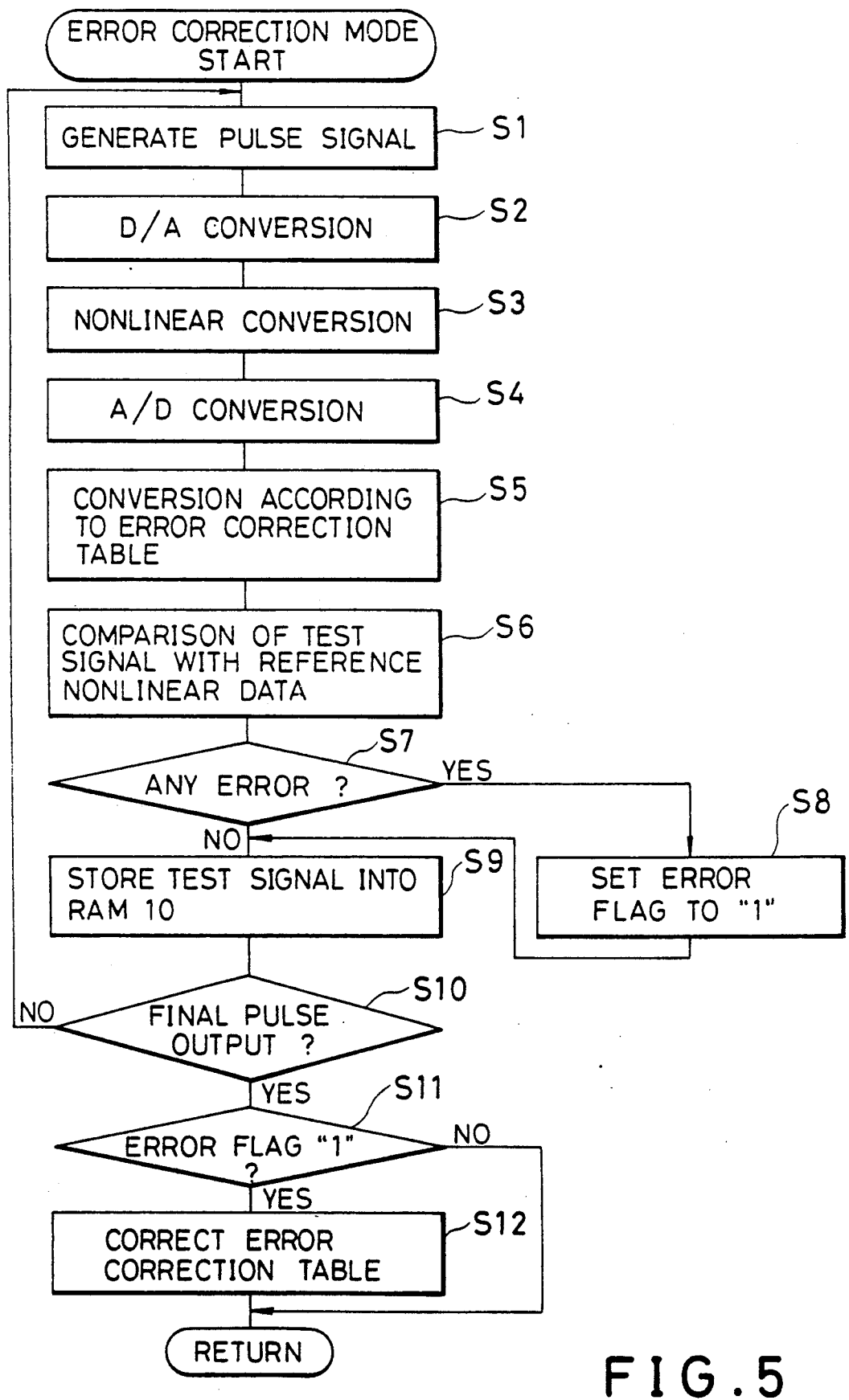
FIG. 5 is a flowchart showing the operation of the embodiment.

Incidentally, the error correction table 6 need not be initialized when step S5 in FIG. 5 is performed in the error correction mode. For example, let us assume that the error correction table 6 has been updated as shown in FIG. 4B by the first error correction processing, that the characteristics of the nonlinear circuit 2 change by deterioration with age and the like, and that the test signal TSG changes as 0, 15, 18, 22, 26, 30, ... when the input signal to the nonlinear circuit 2 changes as 0, 1, 2, 3, 4, 5, ... at the second error correction processing. In this case, the error correction table 6 is updated as shown in FIG. 4C. Accordingly, although the error correction table 6 must be initialized when the circuit or the method of the present invention is used for the first time, it need not be initialized thereafter.

2. COMMON MODE

When the switches 1 and 4 are transferred at the positions shown in FIG. 2 (i.e., the switch 1 is connected to the input signal Sin and the switch 4 is connected to the A/D converter 3), the nonlinear quantization circuit enters into the common mode. In the common mode, the input signal Sin converted by the nonlinear circuit 2 is further converted into a digital signal by the A/D converter 3. The digital signal is applied to the address terminal of the RAM 5, thereby to designate the error correction information stored in the error correction table 6 in the RAM 5. In this case, the error correction table 6 has been updated as shown in FIG. 4B. As a result, the output signal Sout from the error correction table 6 is produced in the correct form after undergoing the correction included in the nonlinear circuit 2.

SECOND EMBODIMENT

Figure 6:
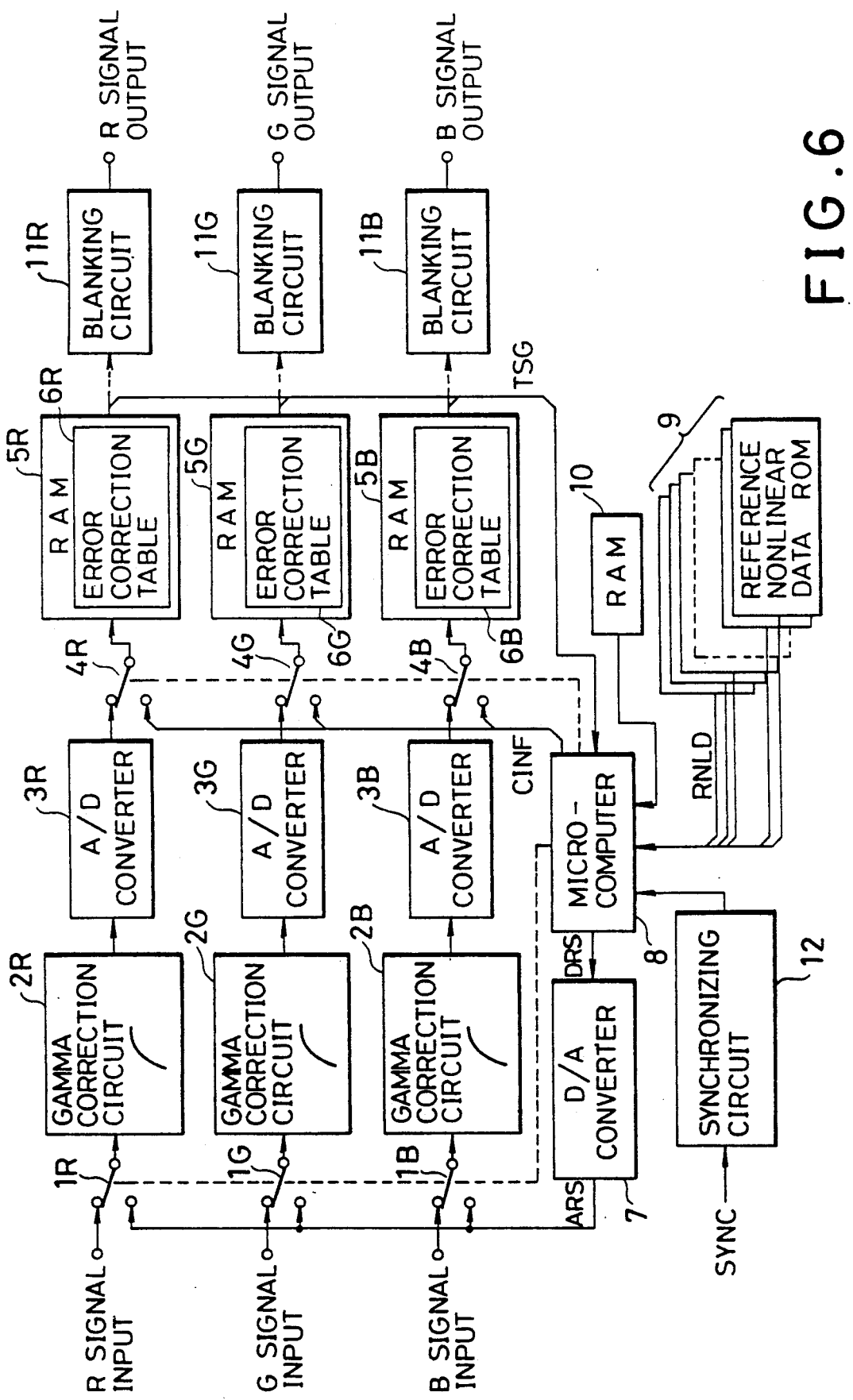
FIG. 6 is a block diagram showing an arrangement of a nonlinear quantization circuit according to a second embodiment of the present invention.

FIG. 6 is a block diagram showing a second embodiment of the present invention. The second embodiment is an example in which the quantization circuit of the present invention is applied to a color television camera. There are three quantization circuits corresponding to R, G, B input signals, respectively. More specifically, there are provided three circuits each having a transfer switch 1 (1R, 1G, 1B), a gamma correction circuit 2 (2R, 2G, 2B) corresponding to the nonlinear circuit 2, an A/D converter 3 (3R, 3G, 3B), a transfer switch 4 (4R, 4G, 4B), and a RAM 5 (5R, 5G, 5B) including an error correction table 6 (6R, 6G, 6B). In addition, three blanking circuits 11 (11R, 11G, 11B) are provided for receiving the output signals from the error correction tables 6. Moreover, a synchronizing circuit 12 is connected to the microcomputer 8. The synchronizing circuit 12 interrupts to the microcomputer 8 at the starting points of each horizontal blanking interval and vertical blanking interval.

In the second embodiment, the error correction mode and the common mode are alternately performed on the time sharing basis by transferring the switches 1 and 4 by the microcomputer 8.

(1) ERROR CORRECTION MODE

The microcomputer 8 enters into the error correction mode by changing the switches 1 to the positions opposite to those shown in FIG. 6 (i.e., the switches 1 are connected to the D/A converter 7). On receiving an interrupt caused by the horizontal blanking interval from synchronizing circuit 12, the microcomputer 8 generates a single pulse increasing by one step each time the horizontal blanking interval occurs. The single pulses constitute the reference digital signal DRS. After that, update of the error correction table 6 is independently performed for each of the R, G and B channels.

More specifically, each time the reference digital signal DRS is generated, the test signal TSG is written into the RAM 10, and is compared with the reference nonlinear data RNLD. When the signal TSG and the data RNLD disagree, that is, when any one of the gamma correction circuits 2 includes deviation from the predetermined nonlinearity, the error correction table 6 is updated by using the test signal TSG and the reference nonlinear data RNLD. The microcomputer 8 updates the error correction table 6 during the vertical blanking intervals by changing the switches 4 to the positions opposite to those shown in FIG. 6. The single pulses superimposed on the horizontal blanking intervals are suppressed in the blanking circuit 11.

It is clear that the single pulses can be replaced by a plurality of pulses each of which sequentially increases by a fixed step.

(2) COMMON MODE

Microcomputer 8 enters into the common mode by placing the switches 1 and 4 at the positions shown in FIG. 6. In the common mode, each video signal R, G, B is independently undergoes gamma correction, and is quantized by the A/D converter 3. Each quantized signal further undergoes the error correction by the error correction table 6, is added blanking signals in the blanking circuit 11, and is produced as the output video signal. Thus, the errors included in the gamma correction circuits 2 are independently corrected for respective video signals R, G and B. This prevents color tone changes resulting from the errors of the nonlinear curves of the R, G and B channels, thus improving the quality of the video signal.

In the second embodiment shown in FIG. 6, the error correction mode is carried out during the horizontal and vertical blanking intervals. Consequently, the error correction mode can be performed in parallel with the operation of the color television camera on the time sharing basis. When the error correction table 6 is initialized during the operation of the circuit of FIG. 6, the data of the error correction table 6 may sharply change after the initialization. This change of the data by the initialization will suddenly change the gamma characteristics of the gamma correction circuit 2, resulting in the sudden change of the output of the gamma correction circuit 2. Thus, the output image of the television camera will greatly differ before and after the initialization. In contrast with this, when the error correction table 6 is updated from the state before the initialization (for example, from the state shown in FIG. 4B) to the state shown in FIG. 4C, the amount of correction is assumed to be smaller. Thus the change of the output of the gamma correction circuit 2 will be small, preventing a sudden change in the output image of the television camera.

In addition to the above embodiments, the following modifications can be arranged.

(1) Any nonlinear quantization can be achieved by prestoring any predetermined nonlinear curve in advance as reference nonlinear data. Furthermore, the present invention can also be applied to linear correction as well as the nonlinear correction.

(2) Although in the second embodiment the error correction is performed during the horizontal and vertical blanking intervals so that the error correction does not interfere with the video signals, the error correction can be performed during the video intervals. This will greatly shorten the processing time.

(3) Although in the second embodiment the test signals are acquired by transferring the switches 1 during the horizontal blanking intervals, the switches 1 are unnecessary. This is because the reference digital signal DRS is superimposed on the horizontal blanking intervals on the time sharing basis.

(4) In the above embodiments the update and interpolation of the error correction table 6 is carried out after completing the acquisition of all the test signals TSG. The timing of update and interpolation is not restricted to the above. For example, the interpolation and the update can be sequentially performed at the time when the test signals required for interpolation have been acquired (the number of signal required is two for the linear interpolation, and three for the two dimension interpolation).

According to the present invention, a stable nonlinear signals can be obtained without adjustment of the analog nonlinear circuits because errors or variations of the analog nonlinear circuits resulting from the deterioration with age and the influence of environmental temperature can be suppressed. In short, high stability nonlinear quantization can be achieved with a simple analog nonlinear circuit. In addition, the gamma correction in a color television camera can be correctly achieved without adjusting the gamma curves, thus preventing the color tone changes caused by the level changes.

Although specific embodiments of an error correction method and circuit for nonlinear quantization circuit constructed in accordance with the present invention have been disclosed, it is not intended that the invention be restricted to either the specific configurations or the uses disclosed herein. Further modifications may be made in a manner obvious to those skilled in the art. Accordingly, it is intended that the invention be limited only by the scope of the appended claims.

What is claimed is:

1. An error correction circuit for nonlinear quantization circuit comprising:
   a nonlinear circuit for performing a nonlinear conversion to an analog input signal;
   means for generating a digital reference signal changing in a predetermined form;
   a digital-to-analog converter for converting the digital reference signal to an analog reference signal;
   means for feeding either the analog reference signal or the analog input signal to the nonlinear circuit;
   an analog-to-digital converter for converting an analog signal produced from the nonlinear circuit into a digital signal;
   an error correction table for converting the digital signal produced from the analog-to-digital converter so as to produce a corrected digital signal;
   first memory means for storing a test signal which is produced from the error correction table when the analog reference signal is applied to the nonlinear circuit;
   second memory means for prestoring reference data corresponding to the test signal when the nonlinear circuit has no error; and
   means for comparing the test signal and the reference data, and for updating the error correction table by the test signal and the reference data when the test signal and the reference data disagree;
   wherein the output of the A/D converter undergoes the error correction by the error correction table and is produced as an output signal when the analog input signal is supplied to the nonlinear circuit.

2. An error correction circuit for nonlinear quantization circuit as claimed in claim 1, further comprising means for interpolating error correction information in the error correction table by using a predetermined interpolation.

3. An error correction circuit for nonlinear quantization circuit as claimed in claim 2, wherein the predetermined interpolation is a linear interpolation.

4. An error correction circuit for nonlinear quantization circuit as claimed in claim 2, wherein the predetermined interpolation is an interpolation using a least squares method.

5. An error correction circuit for nonlinear quantization circuit as claimed in claim 1, wherein means for feeding either the analog reference signal or the analog input signal to the nonlinear circuit is a first switch provided at a preceding stage of the nonlinear circuit.

6. An error correction circuit for nonlinear quantization circuit as claimed in claim 5, further comprising a second switch provided at the preceding stage of the error correction table for switching the output of the A/D converter and error correction information used for updating the error correction table, wherein quantization of the analog input signal and update of the error correction table are performed by transferring the first and second switches.

7. An error correction circuit for nonlinear quantization circuit comprising:
   gamma correction circuits for performing gamma correction to color video input signals;
   means for generating a digital reference signal changing in a predetermined form;
   a digital-to-analog converter for converting the digital reference signal to an analog reference signal;
   means for feeding either the analog reference signal or the analog input signal to the gamma correction circuits;
   analog-to-digital converters for independently converting the color video signals produced from the gamma correction circuits into digital signals;
   error correction tables for independently correcting the digital signals produced from the analog-to-digital converters so as to produce corrected digital signals;
   first memory means for storing test signals which are produced from the error correction tables when the analog reference signal is applied to the gamma correction circuits;
   second memory means for prestoring reference data corresponding to the test signals when the gamma correction circuits have no error; and
   means for comparing the test signals and the reference data, and for updating the error correction tables by the test signals and the reference data when the test signals and the reference data disagree;

wherein the outputs of the A/D converters undergo the error correction by the error correction tables and are produced as color video output signals when the color video input signals are supplied to the gamma correction circuits.

8. An error correction circuit for nonlinear quantization circuit as claimed in claim 7, wherein the digital reference signal is composed by pulse signals increasing or decreasing by a fixed amount.

9. An error correction circuit for nonlinear quantization circuit as claimed in claim 8, wherein the means for generating the digital reference signal generates one or more of the pulse signals during a horizontal blanking interval.

10. An error correction circuit for nonlinear quantization circuit as claimed in claim 9, further comprising blanking circuits for suppressing the pulse signals generated during the horizontal blanking intervals.

11. An error correction circuit for nonlinear quantization circuit as claimed in claim 7, wherein the means for updating the error correction tables updates the error correction tables during the vertical blanking intervals.

12. An error correction circuit for nonlinear quantization circuit as claimed in claim 7, wherein generation of the test signals and update of the error correction tables are performed during video intervals.

13. An error correction method for nonlinear quantization circuit having a nonlinear circuit for performing nonlinear conversion to an analog input signal, and an error correcting table for correcting the output of the nonlinear circuit, said error correction method comprising the steps of:

generating a digital reference signal changing in accordance with a predetermined form;

converting the digital reference signal into an analog reference signal;

feeding the analog reference signal to the nonlinear circuit;

converting an analog signal produced from the nonlinear circuit into a digital signal;

storing a test signal which is produced from the error correction table when the digital signal is applied to the error correction table;

storing the reference data corresponding to a waveform of the test signal obtained when the nonlinear circuit has no error;

comparing the test signal and the reference data, and updating the error correction table by using the test signal and the reference data when the test signal and the reference data disagree; and supplying the analog input signal to the nonlinear circuit, applying an output signal of the nonlinear circuit to the error correction table, and outputting an output of the error correction table as a corrected output signal.

* * * * *